(12) United States Patent
Tang (10) Patent No.: US 11,516,835 B2
(45) Date of Patent: Nov. 29, 2022

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 64 days.

(21) Appl. No.: 16/757,141

(22) PCT Filed: Nov. 14, 2017

(86) PCT No.: PCT/CN2017/110945
§ 371 (c)(1),
(2) Date: Apr. 17, 2020

(87) PCT Pub. No.: WO2019/095112
PCT Pub. Date: May 23, 2019

(65) Prior Publication Data
US 2020/0344786 A1    Oct. 29, 2020

(51) Int. Cl.
*H04W 72/12*    (2009.01)
*H04W 76/27*    (2018.01)
(Continued)

(52) U.S. Cl.
CPC ....... *H04W 72/1284* (2013.01); *H04W 48/16* (2013.01); *H04W 72/0413* (2013.01);
(Continued)

(58) Field of Classification Search
None
See application file for complete search history.

(56) References Cited

U.S. PATENT DOCUMENTS

2011/0103327 A1    5/2011    Lee
2015/0173048 A1    6/2015    Seo et al.
(Continued)

FOREIGN PATENT DOCUMENTS

CN    106961741 A        7/2017
EP    3038398 A1 *    6/2016    ............... H04L 5/14
(Continued)

OTHER PUBLICATIONS

3GPP TSG RAN Meeting #77, RP-172115, NTT Docomo, Inc, "Revised WID on New Radio Access Technology", mailed on Sep. 18, 2017.
(Continued)

*Primary Examiner* — Chi H Pham
*Assistant Examiner* — Raul Rivas
(74) *Attorney, Agent, or Firm* — Perkins Coie LLP (57) ABSTRACT

Disclosed in the embodiments of the present application are a data transmission method, a terminal device and a network device. The method comprises: a terminal device receiving N pieces of uplink authorization information sent by a network device, the N pieces of uplink authorization information being used to indicate N uplink resources, any two uplink resources among the N uplink resources at least partially overlapping, the values of at least one attribute, respectively corresponding to the any two uplink resources among the N uplink resources, being different, N being a positive integer greater than 1; and the terminal device processing the N pieces of uplink authorization information according to priorities of the at least one attribute respectively corresponding to the N pieces of uplink resources. The method, terminal device and network device in the embodiments of the present application facilitate improvement of the flexibility of uplink data transmission.

11 Claims, 3 Drawing Sheets

(51) Int. Cl.
    *H04W 48/16*     (2009.01)
    *H04W 72/04*     (2009.01)
    *H04W 72/10*     (2009.01)

(52) U.S. Cl.
    CPC ....... *H04W 72/0446* (2013.01); *H04W 72/10* (2013.01); *H04W 72/1268* (2013.01); *H04W 76/27* (2018.02)

(56) References Cited

U.S. PATENT DOCUMENTS

| | | | |
|---|---|---|---|
| 2015/0282210 | A1* | 10/2015 | Li .................. H04W 74/004 455/452.2 |
| 2016/0095134 | A1 | 3/2016 | Chen et al. |
| 2017/0303215 | A1* | 10/2017 | Kim .................. H04W 52/383 |
| 2017/0303302 | A1 | 10/2017 | Bagheri et al. |
| 2017/0318594 | A1 | 11/2017 | Babaei et al. |
| 2019/0149278 | A1 | 5/2019 | Chen et al. |

FOREIGN PATENT DOCUMENTS

| | | |
|---|---|---|
| JP | 2017535144 A | 11/2017 |
| WO | 2016054238 A2 | 4/2016 |
| WO | 2017172479 A1 | 10/2017 |

OTHER PUBLICATIONS

Vivo: "UL data transmission procedure", 3GPP Draft; R1-1717500 UL Data Transmission Procedure, 3rd Generation Partnership Project (3GPP), Mobilecompetence Centre ; 650, Route Des Lucioles; F-06921 Sophia-Antipolis Cedex France, vol. RAN WG1, No. Prague, CZ; Oct. 9, 2017-Oct. 13, 2017 Oct. 8, 2017 (Oct. 8, 2017), XP051340688, Retrieved from the Internet: URL: http://www.3gpp.org/ftp/Meetings_3GPP_SYNC/RAN1/Docs/[ retrieved on Oct. 8, 2017] * paragraph [03.3] *.

Catt: "Discussion on multiplexing of normal TTI and STTI in UL", 3GPP Draft; R1-1702047, 3rd Generation Partnership Project (3GPP), Mobile Competence Centre 650, Route Des Lucioles: F-06921 Sophia-Antipolis Cedex France vol. RAN WG1, No. Athens, Greece; Feb. 13, 2017-Feb. 17, 2017 Feb. 12, 2017 (Feb. 12, 2017), XP051209208, Retrieved from the Internet: URL: http://www.3gpp.org/ftp/Meetings_3GPP_SYNC/RAN1/Docs/[ retrieved on Feb. 12, 2017] * paragraph [0002] *.

Nokia et al: "Multiple UL SPS configuration collision handling",3GPP Draft; R2-1708592 Multiple UL SPS Configuration C Ollision Handling. 3rd Generation Partnership Project (3GPP), Mobilecompetence Centre : 650, Route Des Lucioles: F-06921 Sophia-Antipolis Cedex vol. RAN WG2, No. Berlin, Germany;Aug. 21, 2017-Aug. 25, 2017 Aug. 20, 2017 (Aug. 20, 2017), XP051318439, Retrieved from the Internet: URL: http://www.3gpp.org/ftp/Meetings_3GPP_SYNC/RAN2/Docs/* paragraphs [0002], [0003] *.

Supplementary European Search Report in the European application No. 17932174.0, dated Jul. 28, 2020.

Written Opinion of the International Search Authority in the international application No. PCT/CN2017/110945, dated Jul. 20, 2018.

International Search Report in the international application No. PCT/CN2017/110945, dated Jul. 20, 2018.

Samsung. Enhancement of LCP for Supporting Multiple Numerologies in NR. 3GPP TSG RAN WG2 #95bis R2-166469. Oct. 14, 2016(Oct. 14, 2016), pp. 1-6.

Huawei et al. LCP with Multiple Numerologies. 3GPP TSG-RAN WG2 Meeting #96 R2-167575. Nov. 18, 2016 (Nov. 18, 2016), pp. 1-3.

Samsung. Logical Channel Prioritization Considering Multiple Numerologies and/or TTIs. 3GPP TSG RAN WG2 #96 R2-168040. Nov. 18, 2016(Nov. 18, 2016), pp. 1-5.

3GPP TSG RAN Meeting #74 RP-162469, Vienna, Austria, Dec. 5-8, 2016, Source: NTT Docomo, Title: Revision of SI: Study on New Radio Access Technology, Document for: Discussion, Agenda Item: 9.2.2.

First Office Action of the Indian application No. 202017023793, dated Jun. 21, 2021.

Intel Corporation, UL grant processing order, 3GPP TSG-RAN WG2 NR Meeting #99 R2-1708824, Berlin, Germany, Aug. 21-25, 2017. 3 pages.

First Office Action of the Japanese application No. 2020-524431, dated Oct. 15, 2021. 13 pages with English translation.

First Office Action of the Taiwanese application No. 107140362, dated Nov. 19, 2021. 14 pages with English translation.

First Office Action of the European application No. 17932174.0, dated Feb. 17, 2022. 8 pages.

First Office Action of the Korean application No. 10-2020-7013803, dated Jun. 8, 2022. 20 pages with English Translation.

Decision of Refusal of the Japanese application No. 2020-524431, dated May 31, 2022. 8 pages with English Translation.

Ericsson, R2-1702747, "Aspects of grant-free and contention based UL transmission in NR", 3GPP TSG RAN WG2 #97bis, 3GPP Server Disclosure Date (Mar. 25, 2017). 3 pages.

* cited by examiner

FIG. 1

| 100 | A terminal device receives N pieces of uplink authorization information sent by a network device, the N pieces of uplink authorization information are used to indicate N uplink resources, any two uplink resources among the N uplink resources are at least partially overlapped, the values of at least one attribute respectively corresponding to the any two uplink resources among the N uplink resources are different and N is a positive integer greater than 1 | ~110 |

The terminal device processes the N pieces of uplink authorization information according to priorities of the at least one attribute respectively corresponding to the N uplink resources ~120

DATA TRANSMISSION METHOD, TERMINAL DEVICE AND NETWORK DEVICE

CROSS-REFERENCE TO RELATED APPLICATIONS

The present application is a U.S. National Phase Entry of International PCT Application No. PCT/CN2017/110945 filed on Nov. 14, 2017, and entitled "DATA TRANSMISSION METHOD, TERMINAL DEVICE AND NETWORK DEVICE", the content of which is hereby incorporated by reference in its entirety.

TECHNICAL FIELD

The embodiments of the present disclosure relate to the field of communications, and in particular, to a data transmission method, a terminal device and a network device.

BACKGROUND

With the continuous evolution of a wireless communication technology, since the type of an uplink resource is relatively single in Long Term Evolution (LTE), that is, a fixed attribute is adopted, for example, a fixed Transmission Time Interval (TTI) length, a fixed basic numerology, a fixed time interval K2 from an uplink authorization resource to the uplink resource, a fixed Semi-Persistent Scheduling (SPS) configuration, and the like, such that the optimization cannot be made to all services. Therefore, there is an urgent need for a new method for data transmission that can improve the flexibility of transmission of the uplink data.

SUMMARY

In view of the above, in the embodiments of the present disclosure, there is provided a data transmission method, a terminal device and a network device, to improve the flexibility of transmission of uplink data.

In a first aspect, there is provided a data transmission method, which includes: a terminal device receives N pieces of uplink authorization information sent by a network device, the N pieces of uplink authorization information are used to indicate N uplink resources, any two uplink resources among the N uplink resources are at least partially overlapped, the values of at least one attribute respectively corresponding to the any two uplink resources among the N uplink resources are different and N is a positive integer greater than 1; and the terminal device processes the N pieces of uplink authorization information according to priorities of the at least one attribute respectively corresponding to the N uplink resources.

Processing corresponding uplink authorization information according to the priorities of at least one attribute respectively corresponding to multiple uplink resources having a resource conflict is beneficial to improving the flexibility of transmission of uplink data.

The transmission of uplink resources have the conflict, which may refer to that different uplink resources are at least partially overlapped in time domain and/or frequency domain. The overlap of more than two uplink resources may refer to that these uplink resources are overlapped, or may refer to that every two uplink resources are overlapped.

The uplink resource in a New Radio (NR) system may have multiple types, and may, for example, have multiple attributes: a TTI length, a basic numerology, a time interval K2 from the uplink authorization resource to the uplink resource, an SPS configuration or a Radio Network Temporary Identity (RNTI).

The so-called priority of at least one attribute corresponding to the uplink resources may refer to priorities for multiple values of an attribute, or may priorities for respective attributes.

In a possible implementation manner, the at least one attribute respectively corresponding to the N uplink resources includes and only includes a first attribute, the values of the first attribute respectively corresponding to at least two uplink resources among the N uplink resources are different, the priorities of the at least one attribute respectively corresponding to the N uplink resources are priorities of the first attribute respectively corresponding to the N uplink resources, and the operation that the terminal device processes the N pieces of uplink authorization information according to the priorities of the at least one attribute respectively corresponding to the N uplink resources includes: the terminal device processes the N pieces of uplink authorization information according to the priorities of the values of the first attribute respectively corresponding to the N uplink resources.

Optionally, the network device may configure the terminal device no matter whether the priority is configured for other attributes, and the terminal device only processes the uplink authorization information according to the priority of the first attribute.

In a possible implementation manner, the first attribute is the TTI length, the basic numerology, the time interval from the uplink authorization resource to the uplink resource, the SPS configuration or the RNTI.

In a possible implementation manner, the operation that the terminal device processes the N pieces of uplink authorization information according to the priorities of the values of the first attribute respectively corresponding to the N uplink resources includes: the terminal device determines O pieces of uplink authorization information from the N pieces of uplink authorization information according to the priorities of the values of the first attribute respectively corresponding to the N uplink resources, O is the positive integer, and O is smaller than N; and the terminal device sends uplink data to the network device according to the O pieces of uplink authorization information.

In a possible implementation manner, at least one attribute respectively corresponding to the N uplink resources includes a second attribute and a third attribute, the values of the second attribute respectively corresponding to at least two uplink resources among the N uplink resources are different, the values of the third attribute respectively corresponding to at least two uplink resources among the N uplink resources are different, and the operation that the terminal device processes the N pieces of uplink authorization information according to the priorities of the at least one attribute respectively corresponding to the N uplink resources includes: the terminal device processes the N pieces of uplink authorization information sequentially according to the priorities of the values of the second attribute respectively corresponding to the N uplink resources and the priorities of the values of the third attribute respectively corresponding to the N uplink resources.

Optionally, the network device may configure the priority for more than two attributes, and the terminal device may process the uplink authorization information according to the combination of the priorities of the more than two attributes.

In a possible implementation manner, the second attribute and the third attribute are a combination of any two attributes in the following attributes: the TTI length, the basic numerology, the time interval from the uplink authorization resource to the uplink resource, the SPS configuration or the RNTI.

In a possible implementation manner, the priority of the second attribute is higher than that of the third attribute; and the operation that the terminal device processes the N pieces of uplink authorization information sequentially according to the priorities of the values of the second attribute respectively corresponding to the N uplink resources and the priorities of the values of the third attribute respectively corresponding to the N uplink resources includes: the terminal device determines M pieces of uplink authorization information from the N pieces of uplink authorization information according to the priorities of the values of the second attribute respectively corresponding to the N uplink resources, M is a positive integer greater than 1, and M is smaller than N; the terminal device determines K pieces of uplink authorization information from the M pieces of uplink authorization information according to the priorities of the values of the third attribute respectively corresponding to M uplink resources in one-to-one correspondence to the M pieces of uplink authorization information, the values of the third attribute respectively corresponding to at least two uplink resources among the M uplink resources are different, K is a positive integer, and K is smaller than M; and the terminal device sends the uplink data to the network device according to the K pieces of uplink authorization information.

In a possible implementation manner, the method further includes: the terminal device receives the priorities of the at least one attribute respectively corresponding to the multiple uplink resources sent by the network device.

In a possible implementation manner, the priorities of the at least one attribute respectively corresponding to the multiple uplink resources are carried in Radio Resource Control (RRC) signaling, Media Access Control (MAC) signaling or Downlink Control information (DCI).

In a second aspect, there is provided a data transmission method, which includes: a network device allocates a priority to each attribute in at least one attribute of the following attributes: a TTI length, a basic numerology, a time interval K2 from an uplink authorization resource to an uplink resource, an SPS configuration or a RNTI; and the network device sends the priority of each attribute to a terminal device.

In a possible implementation manner, the priority is carried in RRC signaling, MAC signaling or DCI.

In a possible implementation manner, at least one attribute includes multiple attributes, and the method further includes: the network device allocates the priorities to the multiple attributes; and the network device sends the priorities of the multiple attributes to the terminal device.

In a third aspect, there is provided a terminal device, configured to execute the method in the first aspect or any possible implementation manner of the first aspect. Specifically, the terminal device includes a unit configured to execute the method in the first aspect or any possible implementation manner of the first aspect.

In a fourth aspect, there is provided a network device, configured to execute the method in the second aspect or any possible implementation manner of the second aspect. Specifically, the network device includes a unit configured to execute the method in the second aspect or any possible implementation manner of the second aspect.

In a fifth aspect, there is provided a terminal device, which includes: a memory, a processor, an input interface and an output interface. The memory, the processor, the input interface and the output interface are connected via a bus system. The memory is configured to store an instruction; and the processor is configured to execute the instruction stored by the memory, and configured to execute the method in the first aspect or any possible implementation manner of the first aspect.

In a sixth aspect, there is provided a network device, which includes: a memory, a processor, an input interface and an output interface. The memory, the processor, the input interface and the output interface are connected via a bus system. The memory is configured to store an instruction; and the processor is configured to execute the instruction stored by the memory, and configured to execute the method in the second aspect or any possible implementation manner of the second aspect.

In a seventh aspect, there is provided a computer storage medium, configured to store a computer software instruction for executing the method in the first aspect or any possible implementation manner of the first aspect, or the method in the second aspect or any possible implementation manner of the second aspect, and including a program designed to execute the above aspects.

In an eighth aspect, there is provided a computer program including an instruction, which enables, when running on a computer, the computer to execute the method in the first aspect or any possible implementation manner of the first aspect, or the method in the second aspect or any possible implementation manner of the second aspect.

These aspects or other aspects of the present disclosure will become more apparent in the description of the following embodiments.

DETAILED DESCRIPTION

A clear and complete description of the technical solutions in the embodiments of the present disclosure will be given below, in conjunction with the accompanying drawings in the embodiments of the disclosure.

It is to be understood that the technical solutions in the embodiments of the disclosure may be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system, a New Radio (NR) system or a future 5th Generation (5G) system.

Particularly, the technical solutions in the embodiments of the present disclosure may be applied to various communication systems based on a non-orthogonal multiple access technology, such as a Sparse Code Multiple Access (SCMA) system and a Low Density Signature (LDS) system. Certainly, the SCMA system and the LDS system may also be referred to as other names in the field of communications. Further, the technical solutions in the embodiments of the present disclosure may be applied to multi-carrier transmission systems adopting the non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system and a Filtered-OFDM (F-OFDM) system.

The terminal device in the embodiments of the present disclosure may be User Equipment (UE), an access terminal, a user unit, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices, vehicle-amounted devices and wearable devices connected to a wireless modulator-demodulator, a terminal device in a future 5G network or a terminal device in a future evolved Public Land Mobile Network (PLMN), all of which are not defined in the embodiments of the present disclosure.

The network device in the embodiments of the present disclosure may be a device used for communicating with the terminal device. The network device may be a Base Transceiver Station (BTS) in a GSM or CDMA, may also be a NodeB (NB) in a WCDMA system, may further be an Evolutional NodeB (eNB or eNodeB) in an LTE system and may further be a wireless controller in a Cloud Radio Access Network (CRAN) scenario; or the network device may be a relay station, an access point, a vehicle-amounted device, a wearable device as well as a network device in the future 5G system or a network device in the future evolved PLMN network, all of which are not defined in the embodiments of the present disclosure.

Figure 1:
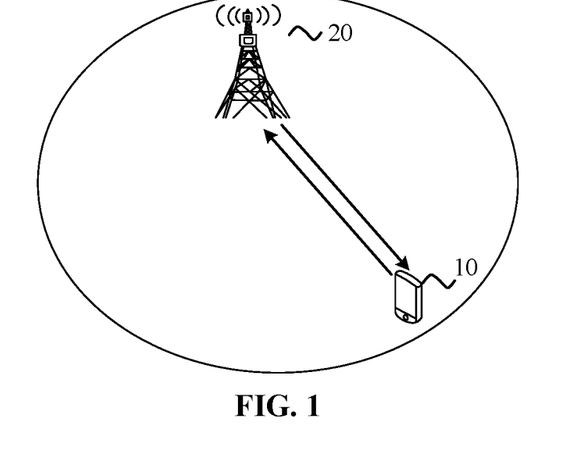
FIG. 1 illustrates a schematic diagram of an application scenario according to an embodiment of the present disclosure.

FIG. 1 is a schematic diagram of an application scenario according to an embodiment of the present disclosure. The communication system in FIG. 1 may include a terminal device 10 and a network device 20. The network device 20 is configured to provide a communication service for the terminal device 10, and the network device 20 accesses a core network. The terminal device 10 accesses a network by means of searching a synchronization signal, a broadcast signal or the like which is sent by the network device 20, to communicate with the network. The arrow illustrated in FIG. 1 may represent uplink/downlink transmission performed via a cellular link between the terminal device 10 and the network device 20.

It is to be understood that the terms "system" and "network" in the specification are often used interchangeably. The term "and/or" in this specification describes only an association relationship for describing associated objects and represents that three relationships may exist. For example, A and/or B may represent the following three cases: only A exists, both A and B exist, and only B exists, that is, at least one of A or B is expressed. In addition, the character "/" in this specification generally indicates an "or" relationship between the associated objects.

Figure 2:
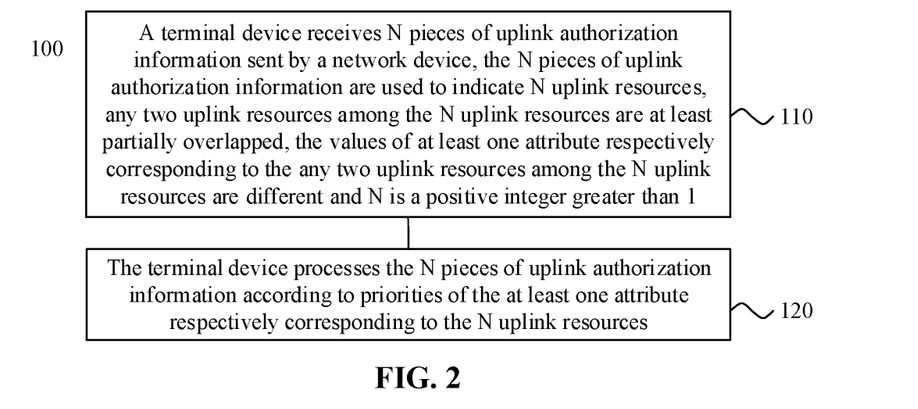
FIG. 2 illustrates a schematic block diagram for data transmission according to an embodiment of the present disclosure.

FIG. 2 illustrates a schematic block diagram of a method 100 for data transmission according to an embodiment of the present disclosure. As illustrated in FIG. 2, the method 100 includes a part or all of the following contents.

At S110, a terminal device receives N pieces of uplink authorization information sent by a network device. The N pieces of uplink authorization information are used for indicating N uplink resources, any two uplink resources among the N uplink resources are at least partially overlapped, the values of at least one attribute respectively corresponding to the any two uplink resources among the N uplink resources are different and N is a positive integer greater than 1.

At S120, the terminal device processes the N pieces of uplink authorization information according to priorities of the at least one attribute respectively corresponding to the N uplink resources.

Therefore, according to the data transmission method in this embodiment of the present disclosure, processing corresponding uplink authorization information according to the priorities of at least one attribute respectively corresponding to multiple uplink resources having a resource conflict is beneficial to improving the flexibility of transmission of uplink data.

With the continuous evolution of communication technology, the diverse service types are required in a future communication system, and the single uplink resource type used in an LTE system cannot meet the communication requirement. Different from the LTE system, in order to keep the flexibility of uplink transmission, the uplink resource in an NR system may have multiple types, and may, for example, have multiple attributes, including: a TTI length, a basic numerology, a time interval K2 from the uplink authorization resource to the uplink resource, an SPS configuration or a RNTI.

In other words, the network device may configure multiple types of uplink resources for the terminal device, and the terminal device may select one type of uplink resource in uplink transmission to perform the uplink transmission on the uplink resource. The uplink resources indicated by different uplink authorizations in this embodiment of the present disclosure have the conflict, which may refer to that different resources are at least partially overlapped in time domain and/or frequency domain. For example, the uplink resource 1 and the uplink resource 2 are overlapped in the time domain. If the terminal device is only allowed to transmit on a part of uplink resources at a present moment, the terminal device needs to process these uplink resources. For example, which resources may be selected for the uplink transmission and on which resources the uplink transmission needs to be abandoned. The overlap of more than two uplink resources may refer to that all these uplink resources are overlapped, or may refer to that every two uplink resources are overlapped, which is not defined by this embodiment of the present disclosure thereto.

In this embodiment of the present disclosure, the network device may allocate the priorities to the values of the above-mentioned various attributes. For example, assuming that the above TTI length may have three values: 1 ms, 2 ms and 4 ms, the network device may allocate the priorities to the three values, for instance, 1 ms is superior to 2 ms which is superior to 4 ms. The priority of multiple attributes corresponding to certain uplink resource may refer to a priority of the value of an attribute among multiple values for the attribute, or may refer to a comprehensive result of the priority of the multiple attributes. For example, the TTI length corresponding to the uplink resource 1 is superior to that corresponding to the uplink resource 2, and the K2 corresponding to the uplink resource 1 is superior to that corresponding to the uplink resource 2. If the network device configures that the grade of the TTI length is higher than that of the K2, the terminal device may first consider the priority of the TTI length; and after the consideration of the priority of the TTI, the priority of the K2 is also taken account to select an allowed number of uplink resources for uplink transmission.

When the network device configures the uplink resources for the terminal device, the network device may also configure the attribute corresponding to the uplink resources for the terminal device. The network device may also configure multiple types of uplink resources for the terminal device in advance, and the terminal device may select the attribute corresponding to some uplink resource by itself.

For better understanding, a part of the above-mentioned attributes will be described briefly hereinafter.

The so-called TTI may be a time domain resource unit for data transmission. The data is generally transmitted with one TTI as a basic transmission unit, such that it is assured that the duration of each data transmission is an integral multiple of the TTI.

The so-called basic numerology may include at least one of the following parameters:

a sub-carrier interval, the number of sub-carriers at a special bandwidth, the number of sub-carriers in a Physical Resource Block (PRB), a length of an OFDM symbol, the number of dots of Fourier transform such as Fast Fourier Transform (FFT) or inverse Fourier transform such as Inverse Fast Fourier Transform (IFFT) for generating the OFDM signal, the number of OFDM symbols in the TTI, the number of TTIs included in a specific time length, and the length of a signal prefix. The sub-carrier interval refers to a frequency interval between adjacent sub-carriers, such as 15 kHz and 60 kHz. The number of sub-carriers at the specific bandwidth is, for example, the number of sub-carriers corresponding to each possible system bandwidth. The number of sub-carriers included in the PRB may be, for example, the integral multiple of 12 typically. The number of OFDM symbols included in the TTI may be, for example, the integral multiple of 14 typically. The number of TTIs included in a certain time unit may refer to the number of TTIs included in a time length of 1 ms or 10 ms. The length of the signal prefix is, for example, the time length of a Cyclic Prefix (CP) of a signal, or whether the CP uses a conventional CP or an extended CP.

Figure 3:
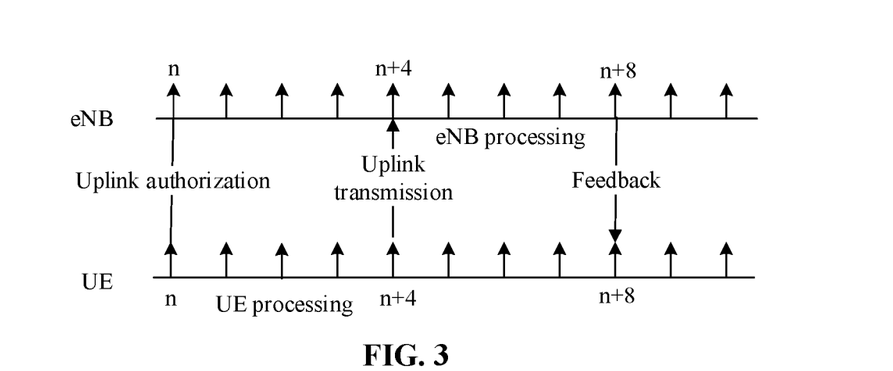
FIG. 3 illustrates a schematic diagram of an LTE-Frequency Division Duplex (LTE-FDD) air interface time sequence.

Generally, a UE schedules uplink data to an eNB based on an uplink authorization. That is, the eNB controls the uplink transmission of the UE by means of the uplink authorization (uplink authorization information includes a size of an allocated air interface resource, a new retransmission indication, a transmission time and other information) for uplink transmission. The time sequence for the uplink transmission is defined clearly in an existing protocol. With an LTE-FDD air interface time sequence as an example, as illustrated in FIG. 3, the eNB sends an uplink authorization in an nth sub-frame; the UE starts to schedule preparation data after receiving the uplink authorization in the nth sub-frame, and UE starts to send the data at an (n+4)th sub-frame; and a network device detects the data sent by the UE and verifies the data in the (n+4)th sub-frame, and the network device feeds a verification result back to the UE in an (n+8)th sub-frame. The time interval between the nth sub-frame and the (n+4)th sub-frame is the K2 in this embodiment of the present disclosure. In the NR system, the K2 is no longer fixed, and the value of the K2 may be changed flexibly according to service performance.

Under a condition where a terminal device does not have too many services, a network device may allocate an SPS resource to the terminal device when the terminal device accesses the network. In this embodiment of the present disclosure, the at least one attribute corresponding to the uplink resources may include the SPS configuration or may not include the SPS configuration. The SPS configuration may be the same to all uplink resources.

Optionally, in this embodiment of the present disclosure, the at least one attribute respectively corresponding to the N uplink resources includes a first attribute, the values of the first attribute respectively corresponding to at least two uplink resources among the N uplink resources are different, the priorities of the at least one attribute respectively corresponding to the N uplink resources are priorities of the values of the first attribute respectively corresponding to the N uplink resources, and the operation that the terminal device processes the N pieces of uplink authorization information according to the priorities of the at least one attribute respectively corresponding to the N uplink resources includes: the terminal device processes the N pieces of uplink authorization information according to the priorities of the values of the first attribute respectively corresponding to the N uplink resources.

Specifically, as long as the network device configures the priorities for multiple values of some attribute in at least one attribute corresponding to the uplink resources, the terminal device may process corresponding uplink authorization information according to the priorities of the values of the attribute corresponding to each uplink resource. The at least one attribute corresponding to each uplink resource may only include the first attribute. The at least one attribute corresponding to each uplink resource may further include other attributes in addition to the first attribute. The network device may configure the priorities for multiple values of the other attributes, or may not configure the priorities for multiple values of the other attributes. The network device may configure the terminal device no matter whether the priorities are configured for the values of other attributes, and the terminal device only processes the uplink authorization information according to the priorities of the values of the first attribute.

Optionally, in this embodiment of the present disclosure, the first attribute may be any attribute of the above attributes including: the TTI length, the basic numerology, the time interval from the uplink authorization resource to the uplink resource, the SPS configuration and the RNTI. The at least one attribute in this embodiment of the present disclosure may be at least one attribute in the above attributes.

Optionally, in this embodiment of the present disclosure, the priority of the value of each attribute in the at least one attribute may be configured or reconfigured by the network device, or may be fixed in a protocol, for example, may be preset in the terminal device. If priority is configured by the network device, the priority may be sent to the terminal device by means of RRC signaling, an MAC Control Element (CE) or DCI.

Optionally, in this embodiment of the present disclosure, the operation that the terminal device processes the N pieces of uplink authorization information according to the priorities of the values of the first attribute respectively corresponding to the N uplink resources includes: the terminal device determines O pieces of uplink authorization information from the N pieces of uplink authorization information according to the priorities of the values of the first attribute respectively corresponding to the N uplink resources, O is the positive integer, and O is smaller than N; and the terminal device sends uplink data to the network device according to the O pieces of uplink authorization information.

If the overlapped portion in the time domain only allows the uplink transmission on uplink resources indicated by a part of uplink authorization information, the terminal device may first select a part of uplink resources for the uplink transmission according to the priority of the value of some attribute configured with the priority in the at least one attribute corresponding to respective uplink resources. For example, the number of the selected uplink resources may be the number of the pieces of uplink authorization information allowed by the terminal device to be processed concurrently. Assuming that the terminal device only is allowed to process one piece of uplink authorization information, the terminal device may only perform the uplink transmission on the uplink resource having the highest priority of the value of the first attribute. Assuming that the terminal device is allowed to process multiple pieces of uplink authorization information concurrently, the terminal device may select the allowed number of the pieces of uplink authorization information for transmission of the uplink data according to a sequence of the priorities of the values of the first attribute from high to low.

Optionally, in this embodiment of the present disclosure, the at least one attribute respectively corresponding to the N uplink resources includes a second attribute and a third attribute, the values of the second attribute respectively corresponding to at least two uplink resources among the N uplink resources are different, the values of the third attribute respectively corresponding to at least two uplink resources among the N uplink resources are different, and the operation that the terminal device processes the N pieces of uplink authorization information according to the priorities of the at least one attribute respectively corresponding to the N uplink resources includes: the terminal device processes the N pieces of uplink authorization information sequentially according to the priorities of the values of the second attribute respectively corresponding to the N uplink resources and the priorities of the values of the third attribute respectively corresponding to the N uplink resources.

Specifically, if the network device allocates the priorities to the values of respective attributes in the multiple attributes, and the at least one attribute corresponding to each uplink resource also includes multiple attributes having the priorities, the terminal device may process corresponding uplink authorization information in combination with the priorities of the values of these attributes. If the at least one attribute corresponding to each uplink resource includes the TTI length and the K2, and the TTI lengths and K2 corresponding to at least two uplink resources are different, for example, the priority of the TTI length is 1 ms>2 ms>4 ms, the TTI length corresponding to the uplink resource 1 is 1 ms, the TTI length corresponding to the uplink resource 2 is 1 ms, the TTI length corresponding to the uplink resource 3 is 1 ms, and the TTI length corresponding to the uplink resource 4 is 2 ms, the priority of the K2 is 4 ms>8 ms, the K2 corresponding to the uplink resource 1 is 8 ms, the K2 corresponding to the uplink resource 2 is 4 ms, the K2 corresponding to the uplink resource 3 is 4 ms and the K2 corresponding to the uplink resource 4 is 4 ms, assuming that the terminal device only is allowed to process two pieces of uplink authorization information at a present moment, the terminal device may first select three uplink resources, namely the uplink resource 1, the uplink resource 2 and the uplink resource 3, according to the priority of the TTI length; and then, the terminal device selects the uplink resource 2 and the uplink resource 3 from the previously selected three uplink resources according to the priority of the K2. In other words, the terminal device may perform the uplink transmission on the finally selected uplink resource 2 and uplink resource 3.

Optionally, in this embodiment of the present disclosure, the priority of the second attribute is higher than that of the third attribute; and the operation that the terminal device processes the N pieces of uplink authorization information sequentially according to the priorities of the values of the second attribute respectively corresponding to the N uplink resources and the priorities of the values of the third attribute respectively corresponding to the N uplink resources includes: the terminal device determines M pieces of uplink authorization information from the N pieces of uplink authorization information according to the priorities of the values of the second attribute respectively corresponding to the N uplink resources, M is the positive integer greater than 1, and M is smaller than N; the terminal device determines K pieces of uplink authorization information from the M pieces of uplink authorization information according to the priorities of the values of the third attribute respectively corresponding to M uplink resources in one-to-one correspondence to the M pieces of uplink authorization information, the values of the third attribute respectively corresponding to at least two uplink resources among the M uplink resources are different, K is the positive integer, and K is smaller than M; and the terminal device sends the uplink data to the network device according to the K pieces of uplink authorization information.

Under a condition where the network device configures the priorities to the values of respective attributes in the multiple attributes, the network device may configure the priorities of respective attributes. For example, if the network device configures the priority to the TTI length and configures the priority to the K2, the network device may configure the terminal device to screen first with the priority of the TTI length, and then select the finally to-be-processed uplink authorization information according to the priority of the K2.

It is to be understood that this embodiment of the present disclosure is described with a combination of the priorities of the values of two attributes, but this embodiment of the present disclosure is not limited thereto, or it may be the combination of the priorities of the values of three attributes, or may be the combination of the priorities of the values of four attributes, etc.

Optionally, in this embodiment of the present disclosure, the second attribute and the third attribute may be the combination of any two attributes in the TTI length, the basic numerology, the K2, the SPS configuration and the RNTI.

Optionally, in this embodiment of the present disclosure, if the number of the pieces of uplink authorization information selected according to the priority of the value of some attribute in the at least one attribute is greater than the number of the pieces of uplink authorization information that can be processed by the terminal device, in other word, it is possible that the number of the pieces of uplink authorization information at the highest priority of the value of the attribute is greater than the number of the pieces of uplink authorization information that can be processed by the terminal device, the terminal device may freely select the number that can be processed by the terminal device in the uplink authorization information at the highest priority of the value of the attribute.

Optionally, in this embodiment of the present disclosure, the multiple priorities may be configured or reconfigured by the network device, or may be fixed in the protocol, for example, may be preset in the terminal device. If the multiple priorities are configured by the network device, the multiple priorities may be sent to the terminal device by means of the RRC signaling, the MAC CE or the DCI.

Figure 4:
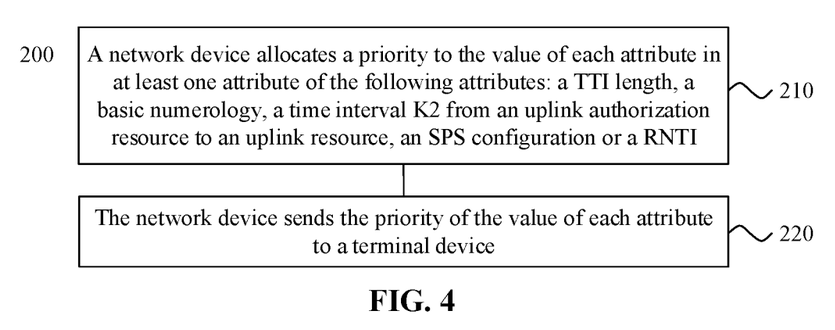
FIG. 4 illustrates another schematic block diagram of a data transmission method according to an embodiment of the present disclosure.

FIG. 4 illustrates a schematic block diagram of a data transmission method 200 according to an embodiment of the present disclosure. As illustrated in FIG. 4, the method 200 includes the following contents in part or in whole.

At S210, a network device allocates a priority to the value of each attribute in at least one attribute of the following attributes: a TTI length, a basic numerology, a time interval K2 from an uplink authorization resource to an uplink resource, an SPS configuration or a RNTI.

At S220, the network device sends the priority of the value of each attribute to a terminal device.

Therefore, the method for transmitting the data in this embodiment of the present disclosure is beneficial to improving the flexibility of transmission of uplink data.

Optionally, in this embodiment of the present disclosure, the priority of the value of each attribute is carried in RRC signaling, MAC signaling or DCI signaling.

Optionally, in this embodiment of the present disclosure, the at least one attribute includes multiple attributes, and the method further includes: the network device allocates the priorities to the multiple attributes; and the network device sends the priorities of the multiple attributes to the terminal device.

It is to be understood that the interaction between the network device and the terminal device, relevant characteristics and functions and the like described by the network device correspond to the relevant characteristics and functions of the terminal device. Relevant content has been described in detail in the method 100, and will no longer be repeated herein for the briefness.

It is further to be understood that the sequence numbers of the foregoing processes do not mean execution sequences in various embodiments of the present disclosure. The execution sequences of the processes should be determined according to functions and internal logics of the processes, and should not be construed as any limitation to the implementation processes of the embodiments of the present disclosure.

The method for transmitting the data according to the embodiments of the present disclosure is described above in detail. Hereinafter, an apparatus for transmitting the data according to the embodiments of the present disclosure is described in combination with FIG. 5 to FIG. 8. The technical features described in the method embodiment are applicable to the following apparatus embodiment.

Figure 5:
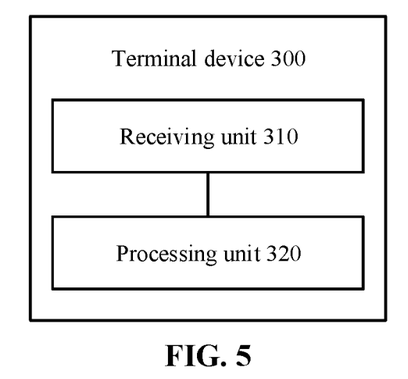
FIG. 5 illustrates a schematic block diagram of a terminal device according to an embodiment of the present disclosure.

FIG. 5 illustrates a schematic block diagram of a terminal device 300 according to an embodiment of the present disclosure. As illustrated in FIG. 5, the terminal device 300 includes: a receiving unit 310, and a processing unit 320.

The receiving unit 310 is configured to receive N pieces of uplink authorization information sent by a network device, the N pieces of uplink authorization information are used for indicating N uplink resources, any two uplink resources among the N uplink resources are at least partially overlapped, the values of at least one attribute respectively corresponding to any two uplink resources among the N uplink resources are different and N is a positive integer greater than 1.

The processing unit 320 is configured to process the N pieces of uplink authorization information according to priorities of the at least one attribute respectively corresponding to the N uplink resources.

Therefore, according the terminal device in this embodiment of the present disclosure, processing corresponding uplink authorization information according to priorities of at least one attribute respectively corresponding to multiple uplink resources having a resource conflict is beneficial to improving the flexibility of transmission of uplink data.

Optionally, in this embodiment of the present disclosure, the at least one attribute respectively corresponding to the N uplink resources includes and only includes a first attribute, the values of the first attribute respectively corresponding to at least two uplink resources among the N uplink resources are different, and the priorities of the at least one attribute respectively corresponding to the N uplink resources are priorities of the values of the first attribute respectively corresponding to the N uplink resources; and the processing unit is specifically configured to: process the N pieces of uplink authorization information according to the priorities of the values of the first attribute respectively corresponding to the N uplink resources.

Optionally, in this embodiment of the present disclosure, the first attribute is a TTI length, a basic numerology, a time interval from the uplink authorization resource to the uplink resource, an SPS configuration or a RNTI.

Optionally, in this embodiment of the present disclosure, the processing unit is specifically configured to: determine O pieces of uplink authorization information from the N pieces of uplink authorization information according to the priorities of the values of the first attribute respectively corresponding to the N uplink resources, O is the positive integer, and O is smaller than N; and send uplink data to the network device according to the O pieces of uplink authorization information.

Optionally, in this embodiment of the disclosure, the at least one attribute respectively corresponding to the N uplink resources includes a second attribute and a third attribute, the values of the second attribute respectively corresponding to at least two uplink resources among the N uplink resources are different, the values of the third attribute respectively corresponding to at least two uplink resources among the N uplink resources are different, and the processing unit is specifically configured to: process the N pieces of uplink authorization information sequentially according to the priorities of the values of the second attribute respectively corresponding to the N uplink resources and the priorities of the values of the third attribute respectively corresponding to the N uplink resources.

Optionally, in this embodiment of the present disclosure, the second attribute and the third attribute are a combination of any two attributes in the following attributes: the TTI length, the basic numerology, the time interval from the uplink authorization resource to the uplink resource, the SPS configuration or the RNTI.

Optionally, in this embodiment of the present disclosure, the priority of the second attribute is higher than that of the third attribute; and the processing unit is specifically configured to: determine M pieces of uplink authorization information from the N pieces of uplink authorization information according to the priorities of the values of the second attribute respectively corresponding to the N uplink resources, M is the positive integer greater than 1, and M is smaller than N; determine K pieces of uplink authorization information from the M pieces of uplink authorization information according to the priorities of the values of the third attribute respectively corresponding to M uplink resources in one-to-one correspondence to the M pieces of uplink authorization information, the values of the third attribute respectively corresponding to at least two uplink resources among the M uplink resources are different, K is the positive integer, and K is smaller than M; and send the uplink data to the network device according to the K pieces of uplink authorization information.

Optionally, in this embodiment of the present disclosure, the receiving unit is further configured to: receive the priorities of the at least one attribute respectively corresponding to the multiple uplink resources sent by the network device.

Optionally, in this embodiment of the present disclosure, the priorities of the at least one attribute respectively corresponding to the multiple uplink resources are carried in RRC signaling, MAC signaling or DCI.

It is to be understood that the terminal device 300 according to this embodiment of the present disclosure may correspond to the terminal device in the method embodiment of the present disclosure. Furthermore, the above and other operations and/or functions of each unit in the terminal device 300 are respectively intended to implement a corresponding process of the terminal device in the method in FIG. 2 and will not be repeated for the briefness.

Figure 6:
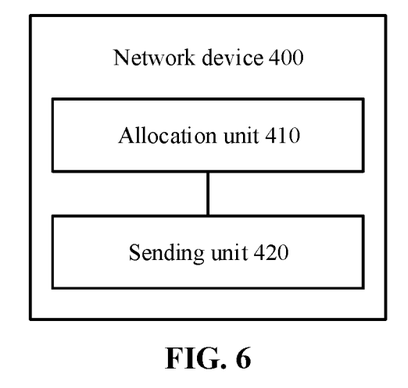
FIG. 6 illustrates a schematic block diagram of a network device according to an embodiment of the present disclosure.

FIG. 6 illustrates a schematic block diagram of a network device 400 according to an embodiment of the present disclosure. As illustrated in FIG. 6, the network device 400 includes: an allocation unit 410, and a sending unit 420.

The allocation unit 410 is configured to allocate a priority to the value of each attribute in at least one attribute of the following attributes: a TTI length, a basic numerology, a time interval K2 from an uplink authorization resource to an uplink resource, an SPS configuration or a RNTI.

The sending unit 420 is configured to send the priority of the value of each attribute to the terminal device.

Therefore, the network device in this embodiment of the present disclosure is beneficial to improving the flexibility of transmission of uplink data.

Optionally, in this embodiment of the present disclosure, the priority of the value of each attribute is carried in RRC signaling, MAC signaling or DCI.

Optionally, in this embodiment of the present disclosure, the at least one attribute includes multiple attributes, and the allocation unit is further configured to: allocate the priorities to the multiple attributes; and the sending unit is further configured to: send the priorities of the multiple attributes to the terminal device.

It is to be understood that the network device 400 according to this embodiment of the present disclosure may correspond to the terminal device in the method embodiment of the present disclosure. Furthermore, the above and other operations and/or functions of each unit in the network device 400 are respectively intended to implement a corresponding process of the network device in the method in FIG. 4 and will not be repeated for the briefness.

Figure 7:
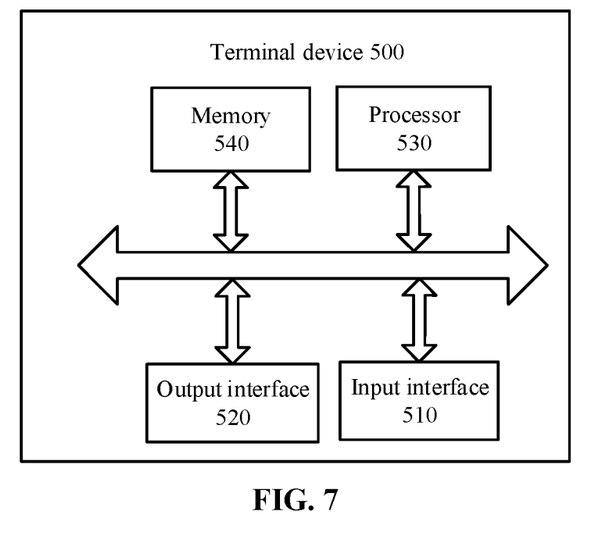
FIG. 7 illustrates another schematic block diagram of a terminal device according to an embodiment of the present disclosure.

As illustrated in FIG. 7, an embodiment of the present disclosure further provides a terminal device 500. The terminal device 500 may be the terminal device 300 in FIG. 5, and can be configured to execute a content of the terminal device corresponding to the method 100 in FIG. 2. The terminal device 500 includes: an input interface 510, an output interface 520, a processor 530 and a memory 540. The input interface 510, the output interface 520, the processor 530 and the memory 540 may be connected via a bus system. The memory 540 is configured to store a program, an instruction or a code. The processor 530 is configured to execute the program, the instruction or the code in the memory 540, to control the input interface 510 to receive a signal, and control the output interface 520 to send the signal and complete the operations in the foregoing method embodiment.

Therefore, according to the terminal device in this embodiment of the present disclosure, processing corresponding uplink authorization information according to the priorities of at least one attribute respectively corresponding to multiple uplink resources having a resource conflict is beneficial to improving the flexibility of transmission of uplink data.

It is to be understood that, in this embodiment of the present disclosure, the processor 530 may be a Central Processing Unit (CPU), and the processor 530 may further be other universal processor, a Digital Signal Processor (DSP), an Application Specific Integrated Circuit (ASIC), a Field Programmable Gate Array (FPGA) or other programmable logic device, separate gate or transistor logic device, separate hardware component and the like. The universal processor may be a microprocessor, or the processor may also be any conventional processor, etc.

The memory 540 may include a Read-Only Memory (ROM) and a Random-Access Memory (RAM) and provides an instruction and data for the processor 530. A part of the processor 540 may further include a nonvolatile random access memory. For example, the processor 540 may further store information on a device type.

During implementation, each content of the method may be completed by means of an integrated logic circuit of hardware or instructions in the form of software in the processor 530. The content of the method disclosed in combination with this embodiment of the present disclosure may be directly embodied as a hardware processor for execution and completion, or a combination of hardware and software modules in the processor for execution and completion. The software module may be located in a mature storage medium in the art such as the RAM, a flash memory, a ROM, a programmable ROM or an electrically erasable programmable memory, and a register. The storage medium is located in the memory 540. The processor 530 reads information in the memory 540, and completes the content of the above methods in combination with hardware. In order to prevent repetition, the above methods will no longer be described in detail.

In one specific embodiment, the receiving unit in the terminal device 300 may be implemented by the input interface 510 in FIG. 7, and the processing unit in the terminal device 300 may be implemented by the processor 530 in FIG. 7.

Figure 8:
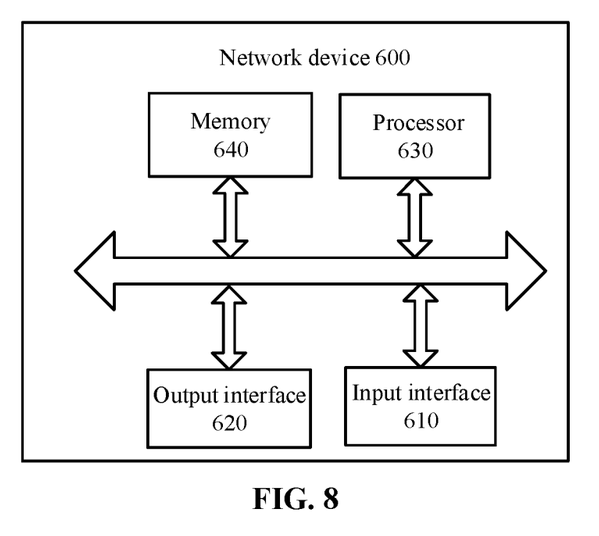
FIG. 8 illustrates another schematic block diagram of a network device according to an embodiment of the present disclosure.

As illustrated in FIG. 8, an embodiment of the present disclosure further provides a network device 600. The network device 600 may be the network device 400 in FIG. 6, and can be configured to execute a content of the network device corresponding to the method 200 in FIG. 4. The network device 600 includes: an input interface 610, an output interface 620, a processor 630 and a memory 640. The input interface 610, the output interface 620, the processor 630 and the memory 640 may be connected via a bus system. The memory 640 is configured to store a program, an instruction or a code. The processor 630 is configured to execute the program, the instruction or the code in the memory 640, to control the input interface 610 to receive a signal, and control the output interface 620 to send the signal and complete the operations in the foregoing method embodiment.

Therefore, the network device in this embodiment of the present disclosure is beneficial to improving the flexibility of transmission of uplink data.

It is to be understood that, in this embodiment of the present disclosure, the processor 630 may be a CPU, and the processor 630 may further be other universal processor, a DSP, an ASIC, an FPGA or other programmable logic device, separate gate or transistor logic device, separate hardware component and the like. The universal processor may be a microprocessor, or the processor may also be any conventional processor, etc.

The memory 640 may include a ROM and a RAM and provides an instruction and data for the processor 630. A part of the processor 640 may further include a nonvolatile random access memory. For example, the processor 640 may further store information on a device type.

During implementation, each content of the method may be completed by means of an integrated logic circuit of hardware or instructions in the form of software in the processor 630. The content of the method disclosed in combination with this embodiment of the present disclosure may be directly embodied as a hardware processor for execution and completion, or a combination of hardware and software modules in the processor for execution and completion. The software module may be located in a mature storage medium in the art such as the RAM, a flash memory, a ROM, a programmable ROM or an electrically erasable programmable memory, and a register. The storage medium is located in the memory 640. The processor 630 reads information in the memory 640, and completes the content of the above methods in combination with hardware. In order to prevent repetition, the above methods will no longer be described in detail.

In one specific embodiment, the sending unit in the network device 400 may be implemented by the output interface 620 in FIG. 8. The allocation unit in the network device 400 may be implemented by the processor 630 in FIG. 8.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by the person skilled in the art that, for the purpose of convenient and brief of description, a detailed working process of the foregoing system, apparatus, and unit may be referred to a corresponding process in the foregoing method embodiment, and details are not described herein again.

In the several embodiments provided in the present disclosure, It is to be understood that the disclosed system, apparatus, and method may be implemented in other manners. For example, the described apparatus embodiment is merely exemplary. For example, the unit division is merely logical function division and may be other divisions in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and components displayed as units may or may not be physical units, may be located in one position, or may be distributed to a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of the disclosure. The foregoing storage medium includes: any medium that can store a program code, such as a U disk, a mobile hard disk, a ROM, a RAM, a magnetic disk, or an optical disc.

The above is only the specific implementation mode of the present disclosure and not intended to limit the scope of protection of the present disclosure. Any variations or replacements apparent to those skilled in the art within the technical scope disclosed by the disclosure shall fall within the scope of protection of the present disclosure. Therefore, the scope of protection of the present disclosure shall be subject to the scope of protection of the claims.

The invention claimed is:

1. A method for data transmission, comprising:
   receiving, by a terminal device, N pieces of uplink authorization information sent by a network device, the N pieces of uplink authorization information being used to indicate N uplink resources, any two uplink resources among the N uplink resources being at least partially overlapped, values of a Semi-Persistent Scheduling (SPS) configuration respectively corresponding to the any two uplink resources among the N uplink resources being different, and N being a positive integer greater than 1; and
   processing, by the terminal device, the N pieces of uplink authorization information according to priorities of the SPS configuration respectively corresponding to the N uplink resources indicated by the N pieces of uplink authorization information;

wherein the priorities of the SPS configuration respectively corresponding to the N uplink resources are priorities of the values of the SPS configuration respectively corresponding to the N uplink resources.

2. The method of claim 1, wherein processing, by the terminal device, the N pieces of uplink authorization information according to the priorities of the SPS configuration respectively corresponding to the N uplink resources comprises:

processing, by the terminal device, the N pieces of uplink authorization information according to the priorities of the values of the SPS configuration respectively corresponding to the N uplink resources.

3. The method of claim 2, wherein processing, by the terminal device, the N pieces of uplink authorization information according to the priorities of the values of the SPS configuration respectively corresponding to the N uplink resources comprises:

determining, by the terminal device, O pieces of uplink authorization information from the N pieces of uplink authorization information according to the priorities of the values of the SPS configuration respectively corresponding to the N uplink resources, O being a positive integer, and O being smaller than N; and sending, by the terminal device, uplink data to the network device according to the O pieces of uplink authorization information.

4. The method of claim 1, wherein the method further comprises:

receiving, by the terminal device, the priorities of the SPS configuration respectively corresponding to the multiple uplink resources sent by the network device.

5. A terminal device, comprising:

an input interface, configured to receive N pieces of uplink authorization information sent by a network device, the N pieces of uplink authorization information being used to indicate N uplink resources, any two uplink resources among the N uplink resources being at least partially overlapped, values of a Semi-Persistent Scheduling (SPS) configuration respectively corresponding to any two uplink resources among the N uplink resources being different and N being a positive integer greater than 1; and a processor, configured to process the N pieces of uplink authorization information according to priorities of the SPS configuration respectively corresponding to the N uplink resources indicated by the N pieces of uplink authorization information;

wherein the priorities of the SPS configuration respectively corresponding to the N uplink resources are priorities of the values of the SPS configuration respectively corresponding to the N uplink resources.

6. The terminal device of claim 5, wherein the processor is specifically configured to:

process the N pieces of uplink authorization information according to the priorities of the values of the SPS configuration respectively corresponding to the N uplink resources.

7. The terminal device of claim 6, wherein the processor is specifically configured to:

determine O pieces of uplink authorization information from the N pieces of uplink authorization information according to the priorities of the values of the SPS configuration attribute respectively corresponding to the N uplink resources, O being a positive integer, and O being smaller than N; and send uplink data to the network device according to the O pieces of uplink authorization information.

8. The terminal device of claim 5, wherein the input interface is further configured to:

receive the priorities of the SPS configuration respectively corresponding to the multiple uplink resources sent by the network device.

9. The terminal device of claim 8, wherein the priorities of the SPS configuration respectively corresponding to the multiple uplink resources are carried in Radio Resource Control (RRC) signaling.

10. The terminal device of claim 8, wherein the priorities of the SPS configuration respectively corresponding to the multiple uplink resources are carried in Media Access Control (MAC) signaling.

11. The terminal device of claim 8, wherein the priorities of the SPS configuration respectively corresponding to the multiple uplink resources are carried in Downlink Control information (DCI) signaling.

* * * * *